United States Patent [19]

Kitaura et al.

[11] 3,895,875
[45] July 22, 1975

[54] DIGITAL INDICATOR FOR CAMERAS

[75] Inventors: Mashio Kitaura; Koutaro Yata; Seiji Yamada, all of Osaka, Japan

[73] Assignee: Minolta Camera Kabushiki Kaisha, Japan

[22] Filed: Aug. 31, 1973

[21] Appl. No.: 393,585

[30] Foreign Application Priority Data
Aug. 31, 1972  Japan............................ 47-101938

[52] U.S. Cl................ 356/226; 235/92 EA; 354/53
[51] Int. Cl............................................. G01j 1/44
[58] Field of Search.......... 356/226, 227, 201, 204; 235/92 EA; 354/53, 23

[56] References Cited
UNITED STATES PATENTS
3,185,819  5/1965  Greiner........................ 235/92 EA
3,528,749  9/1970  Bowker............................ 356/204

Primary Examiner—Ronald L. Wibert
Assistant Examiner—Conrad Clark
Attorney, Agent, or Firm—Staas & Halsey

[57] ABSTRACT

This invention relates to a digital indicator for cameras comprising a light measuring circuit for producing a voltage of the sum of an analog voltage obtained by measuring the object brightness and an analog voltage corresponding to at least the film speed, a circuit for converting the analog voltage derived from the light measuring circuit into a digital signal for providing an indication of an exposure condition, and an indicator unit having a main indicator unit including luminous elements each supplied with the digital signal from the converting circuit to be energized to indicate the corresponding exposure condition and a subindicator unit including luminous elements, each indicating an exposure condition corresponding to a value between adjacent stages of the exposure condition indicated by the main indicator unit.

12 Claims, 5 Drawing Figures

| Pulse | $Q_1$ | $Q_2$ | $Q_3$ | $Q_4$ | $Q_5$ | $Q_6$ | Lighting Luminous Element | |
|---|---|---|---|---|---|---|---|---|
|  | 0 | 0 | 0 | 0 | 0 | 0 |  |  |
| $P_1$ | 1 | 0 | 0 | 0 | 0 | 0 | $M_1$ | $L_1$ |
| $P_2$ | 0 | 1 | 0 | 0 | 0 | 0 | $M_2$ | $L_1$ |
| $P_3$ | 1 | 1 | 0 | 0 | 0 | 0 | $M_3$ | $L_1$ |
| $P_4$ | 0 | 0 | 1 | 0 | 0 | 0 |  | $L_2$ |
| $P_5$ | 1 | 0 | 1 | 0 | 0 | 0 | $M_1$ | $L_2$ |
| $P_6$ | 0 | 1 | 1 | 0 | 0 | 0 | $M_2$ | $L_2$ |
| $P_7$ | 1 | 1 | 1 | 0 | 0 | 0 | $M_3$ | $L_2$ |
| $P_8$ | 0 | 0 | 0 | 1 | 0 | 0 |  | $L_3$ |
| $P_9$ | 1 | 0 | 0 | 1 | 0 | 0 | $M_1$ | $L_3$ |
| $P_{10}$ | 0 | 1 | 0 | 1 | 0 | 0 | $M_2$ | $L_3$ |
| $P_{11}$ | 1 | 1 | 0 | 1 | 0 | 0 | $M_3$ | $L_3$ |
| $P_{12}$ | 0 | 0 | 1 | 1 | 0 | 0 |  | $L_4$ |
| $P_{13}$ | 1 | 0 | 1 | 1 | 0 | 0 | $M_1$ | $L_4$ |
| $P_{14}$ | 0 | 1 | 1 | 1 | 0 | 0 | $M_2$ | $L_4$ |
| $P_{15}$ | 1 | 1 | 1 | 1 | 0 | 0 | $M_3$ | $L_4$ |
| $P_{16}$ | 0 | 0 | 0 | 0 | 1 | 0 |  | $L_5$ |
| $P_{17}$ | 1 | 0 | 0 | 0 | 1 | 0 | $M_1$ | $L_5$ |
| $P_{18}$ | 0 | 1 | 0 | 0 | 1 | 0 | $M_2$ | $L_5$ |
| $P_{19}$ | 1 | 1 | 0 | 0 | 1 | 0 | $M_3$ | $L_5$ |

DIGITAL INDICATOR FOR CAMERAS

BACKGROUND OF THE INVENTION

1. Field of the Invention

This invention relates to a digital indicator for use in cameras which is simple in construction but provides an indication of the required exposure condition with high accuracy.

2. Description of the Prior Art

Hitherto, it has been known in the art to provide a digital indication of suitable exposure conditions by the employment of luminous elements, instead of producing the indication by means of a meter, for the purposes of easy interpretation of the indication in the dark, enhancement of the mechanical strength of the camera and so on. For example, as disclosed in the U.S. application Ser. No. 284,105 or DOS 2,441,046 (German Application laid open to public inspection on Mar. 8, 1973), the indication is provided at a unit of 1Ev (Ev being an exposure value in the sense defined in the APEX system (ASA PH212-1961)) and this presents a problem in providing an indication of high accuracy.

SUMMARY OF THE INVENTION

It is an object of this invention to provide a digital indicator for use in cameras which produces a digital indication of a suitable exposure condition such as a shutter speed, an aperture value, an exposure value or the like with high accuracy and in detail, for example, at a unit less than 1Ev, by the employment of a simple circuit construction.

In accordance with this and other objects, there is provided a light measuring circuit for producing a voltage signal indicative of the sum of an analog voltage obtained by measuring the object brightness and an analog voltage corresponding to at least the film speed, a circuit for converting the analog output voltage from the light measuring circuit into a digital signal for the indication of the suitable exposure condition, a main indicator unit which is composed of a main indicator unit including luminous elements, each supplied with the digital signal for lighting the elements to indicate the exposure condition, and a subindicator unit including luminous elements indicating an exposure condition corresponding to a value between adjacent stages of the exposure condition indicated by the main indicator unit.

In accordance with one feature of this invention, the number of counting stages of a binary counter circuit for counting a signal for the digital indication is increased within the limit of the space of the camera to provide for enhanced accuracy in counting. Further, the subindicator unit is provided seperately of the main indicator unit in a relation such, for example, as that of a vernier to slide calipers to thereby indicate a unit less than that capable of being indicated, by the main indicator unit, thus providing an indication easy to read, with high accuracy, for example, down to a unit of measurement below 1Ev. Although this indicator is capable of providing such a highly accurate indication, its overall construction is extremely simple as compared with that for producing an indication with the main indicator unit only. Especially, the counting stages of the binary counter circuit may be small in number and can easily be incorporated in the limited space of the camera.

BRIEF DESCRIPTION OF THE DRAWINGS

In the detailed description of the preferred embodiments of the invention presented below, reference is made to the accompanying drawings in which:

FIG. 3 is a schematic diagram showing the relationship between a finder and an indicator unit;

FIG. 4 is a schematic diagram, similar to FIG. 3, showing the relationship between the finder and the indicator unit in an example of this invention; and FIG. 5 is a diagram, for explaining the relationships between the states of outputs $Q_1$ to $Q_6$ of a binary counter circuit and the lighting of luminous elements corresponding thereto.

DESCRIPTION OF THE PREFERRED EMBODIMENTS

Figure 1:
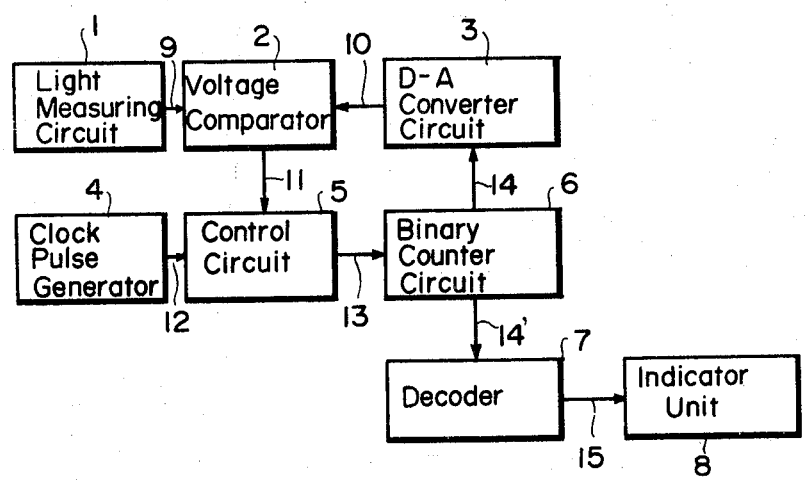
FIG. 1 is a block diagram showing one example of this invention.

FIG. 1 shows in block form one example of this invention. In the figure, reference numeral 1 indicates a light measuring circuit, which includes a light receiving element for the photoelectric conversion of the object brightness and a circuit for generating a voltage signal indicative of the film speed and the diaphragm aperture of a camera and which produces an output indicative of the sum of a first voltage signal proportional to the logarithm of the object brightness and a second voltage signal associated with the film speed and the diaphragm aperture of the camera. In turn, the output 9 is also applied to an exposure time control circuit not shown. Generally, in a single lens reflex camera of the type in which a photoelectric element of a control circuit receives light through an objective lens of the camera, a mirror is held at its sprung-up position during exposure to prevent the light from being directed onto the photoelectric element, so that the output from the light measuring circuit 1 is stored temporarily as a charging voltage in a storing capacitor (not shown) in advance of exposure and the shutter speed is controlled in accordance with the stored voltage. The light measuring circuit 1 is adapted so that the output voltage therefrom may vary by a constant value in response to a change of 1Ev in any of the object brightness, the film speed and the diaphragm aperture of the camera. Such a circuit has already been proposed in our copending U.S. application Ser. No. 301,842 now issued as U.S. Pat. No. 3,777,638 dated Dec. 13, 1973 or DOS No. 2,253,685 (laid open to public inspection under date of Mar. 17, 1973).

Reference numeral 2 designates a voltage comparator circuit formed of a differential amplifier switching circuit, which compares the output voltage from the light measuring circuit 1 with a voltage of an output 10 from a D-A converter circuit 3 described later and from which the resulting compared output 11 is applied to a control circuit 5 described later.

Reference numeral 3 denotes the aforesaid D-A converter circuit formed of a resistance network, which converts a binary coded digital signal into an analog voltage signal indicative of the count achieved by a binary counter 6 described later.

Reference numeral 4 indentifies a clock pulse generator circuit formed of, for example, an astable multivibrator, the output 12 of which is fed to a control circuit 5.

Reference number 5 represents the above-mentioned control circuit, which permits and inhibits the passage therethrough of the clock pulse from the clock pulse generator circuit 4, as applied through its output 13 to the binary counter 6 in accordance with instructions from the voltage comparator circuit 2.

Reference numeral 6 indicates the above-mentioned binary counter circuit, which can be constructed by the multi-stage connection of flip-flops and in which, where the flip-flops are $n$'s stages, $2n$'s pulses can be counted and whose outputs 14 and 14' are supplied to the D-A converter circuit 3 and a decoder 7 hereinbelow mentioned.

Reference numeral 7 designates the above-mentioned decoder which converts the binary-coded signal derived from the counter circuit 6 into a signal suitable for energizing an indicator unit 8 herein below described.

Reference numeral 8 identifies the above-mentioned indicator unit, which is supplied with an output 15 from the decoder 7 to indicate suitable exposure conditions.

Figure 2:
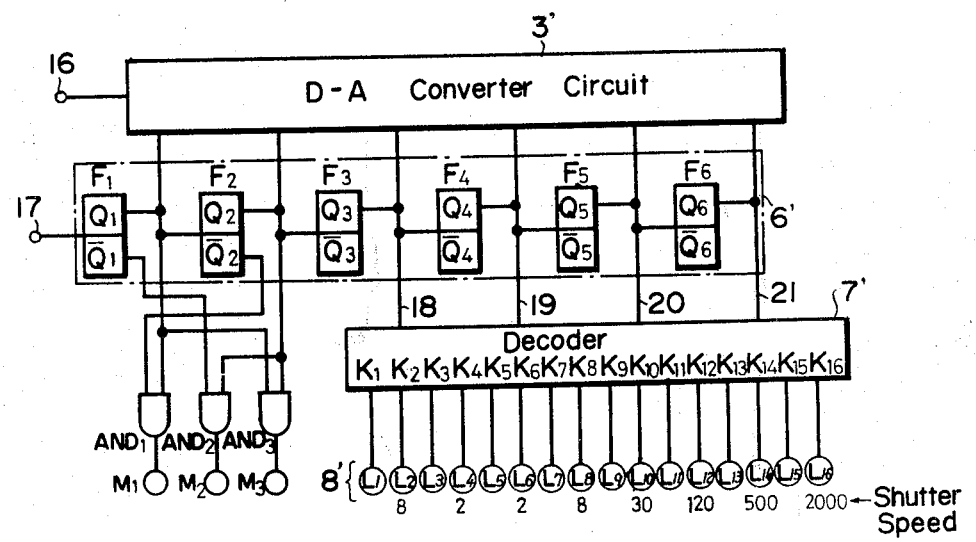
FIG. 2 is a concrete circuit diagram illustrating the principal part of the example of FIG. 1.

FIG. 2 illustrates in a concrete form the principal part of the example depicted in FIG. 1, which corresponds to the D-A converter circuit 3, the binary counter circuit 6, the decoder 7 and the indicator unit 8 shown in FIG. 1.

In FIG. 2, reference numeral 3' designates a D-A converter circuit, which is identical with that circuit 3 shown in FIG. 1.

Reference numeral 6' indicates a binary counter circuit corresponding to that circuit 6 shown in FIG. 1, which comprises flip-flops $F_1$ to $F_6$. Reference characters $Q_1$ to $Q_6$ and $\bar{Q}_1$ to $\bar{Q}_6$ represent outputs therefrom as is well-known in the art. When the outputs $Q_1$ to $Q_6$ from the flip-flops $F_1$ to $F_6$ are 0, the outputs $\bar{Q}_1$ to $\bar{Q}_6$ are 1 and, in the opposite case, the outputs $Q_1$ to $Q_6$ are 1, while outputs $\bar{Q}_1$ to $\bar{Q}_6$ are 0. The output from each stage is applied to the D-A converter circuit 3' and, at the same time, to a decoder 7' and a plurality of AND circuits $AND_1$ to $AND_3$.

Reference numeral 7' identifies the above-mentioned decoder, whose input terminals 18 to 21 are connected to the outputs of the flip-flops $F_3$ to $F_6$ respectively. Sixteen output terminals at the most can be connected to the decoder 7' and the output terminals $K_1$ to $K_{16}$ have respectively connected thereto luminous or radiation emitting elements $L_1$ to $L_{16}$ such, for example, as luminescent diodes energizable to indicate the sensed exposure conditions. Any one of the output terminals $K_1$ to $K_{16}$ of the decoder 7' is put in its state 1 by the counting state of the counter circuit 6' and at every impression of four pulses to an input terminal of the counter circuit 6', the output terminal in the 1 state is sequentially shifted to the adjacent one. Then, when the 1 state has been shifted to the last output terminal $K_{16}$, it is returned to the first output terminal $K_1$ as is well-known in the art.

Reference number 8' denotes an indicator unit comprising the aforementioned luminous elements $L_1$ to $L_{16}$, which are lighted or energized by signals derived from the decoder 7'.

To the outputs of the AND circuits $AND_1$ to $AND_3$ are respectively connected luminous or radiation emitting elements $M_1$ to $M_3$ such, for example, as luminescent diodes, separately of those elements $L_1$ to $L_{16}$ of the main indicator unit 8'. The luminous elements $M_1$ to $M_3$ form the subindicator unit.

The outputs $Q_1$, $\bar{Q}_1$ and $Q_2$ to $\bar{Q}_2$ of the first and second stage flip-flops $F_1$ and $F_2$ of the counter circuit 6' are connected to the AND circuits $AND_1$ and $AND_3$ respectively as shown. Where the outputs $Q_1$ and $Q_2$ are both in the 1 state, none of the luminous elements $M_1$ to $M_3$ are lighted but, in this case, upon impression of a first pulse to the input terminal 17, the luminous element $M_1$ is lighted; upon impression of a second pulse, lighting of the luminous element $M_1$ is stopped and the luminous element $M_2$ is lighted; and upon impression of a third pulse, lighting of the luminous element $M_2$ is stopped and the luminous element $M_3$ is lighted. Upon application of a fourth pulse, the outputs $Q_1$ and $Q_2$ are altered to their 0 state and, thereafter, the same operations are repeated with one cycle of the four pulses.

A description will be given of the operation of the example described above in connection with FIGS. 1 and 2. In the present invention, a circuit well-known as a D-A converter circuit is used to provide an indication of a suitable exposure condition or value and it forms the foundation of this invention that the analog voltage derived from the light measuring circuit is applied as an input voltage to be converted into a digital form to provide a digital signal, which is indicated by the indicator unit.

Next, the operation of the example will be discussed with respect to FIG. 1. The output from the light measuring circuit 1 is compared in the voltage comparator circuit 2 with the output of the D-A converter circuit 3 and when the output level of the D-A circuit 3 has reached that of the light measuring circuit 1, a control signal is applied by the voltage comparator circuit 2 to the control circuit 5 to cause it to stop the supply of the clock pulses derived from the clock pulse generator circuit 4 from being applied to the counter circuit 6. The counting state in the counter circuit 6 is maintained and its counted content is displayed by the main indicator unit 8. The D-A converter circuit 3 converts the binary coded signal into an analog voltage in accordance with the counted content of the counter circuit 6. Consequently, the analog voltage appearing at the output 10 from the D-A converter 3 is not a smooth, continuous voltage but a voltage which varies in a stairstep manner at every impression of the clock pulse. Assuming that the difference between maximum and minimum values of the output 10 from the D-A converter circuit 3, that is the range of the output 9 from the light measuring circuit 1, is constant, the range in which the output 10 from the D-A converter circuit 3 varies with each pulse from the clock pulse generator circuit 3 is dependent upon the number of the stages of the flip-flops of the counter circuit 6 and that range becomes narrower with an increase in the number of the stages of the flip-flops. In general, if the flip-flops are $n$'s stages, that range is divided into $2^n-1$. Accordingly, it is apparent that as the number of the stages of the flip-flops in the counter circuit 6 is increased, the digital output corresponding to the output 9 from the light measuring circuit 1 is subdivided to provide for enhanced accuracy. However, since an increase in the number of the stages of the flip-flops causes an increase in the amount of information to be processed, the construction of the indicator unit 8 inevitably becomes complicated, but, in the case of cameras, the spatial limitation is extremely severe and the complexity of the indicator unit presents a difficult problem in practice.

In the counter circuit 6 described previously with regard to FIG. 1, if the flip-flops comprise four stages, the exposure time can be indicated from 16 sec. to 1/2000 sec. at a unit of 1Ev.

FIG. 3 is a diagram, for explaining the case of providing a digital indication of the output from the counter circuit 6' including four stages of flip-flops. Reference numeral 22 indicates a visual field plane of a finder; 23 refers to a finder visual field frame; and 24 identifies numerals for indicating the shutter speed. Reference characters $L_1$ to $L_6$ indicate luminous or radiation emitting elements which comprise a main indicator unit 8''. For example, the luminous element $L_{16}$ indicates a shutter speed of 1/2000 sec. The indicator unit 8'' corresponds to that unit 8' shown in FIG. 2. The indication by the indicator unit 8'' has heretofore been provided by means of a meter having a pointer for indicating one of the numerals 24.

Where the flip-flops comprise four stages as mentioned above, any one of the luminous elements $L_1$ to $L_{16}$ is lighted to indicate a shutter speed corresponding thereto and the shutter speed is indicated in a digital form at a unit of 1Ev. In this case, however, an error of ±½Ev is theoretically produced between an actual shutter speed and the indicated one. Then, if two stages of flip-flops are added to provide six stages of flip-flops in all, the shutter speed, which is divided into 15 values in the case of four stages, is divided into 63 values and the accuracy is raised four times and the shutter speed can be indicated at a unit of ⅛Ev.

However, it is almost impossible, in practice, to arrange 63 luminous elements along the finder visual field frame and, if it is possible, reading of such a display would be quite difficult.

In the circuit illustratively shown in FIG. 2, the number of stages of the flip-flops is increased without complicating the construction of the main indicator unit 8', thereby providing for enhanced accuracy in the indication.

Now, a description will be made of the lighting state of the luminous elements $M_1$ to $M_3$ and $L_1$ to $L_{16}$ in the case where pulses are continuously applied to the input terminal 17. Assume that the outputs $Q_1$ to $Q_6$ of the flip-flops are all in their 0 state. At this time, the output terminal $K_1$ is in its 1 state to light the luminous element $L_1$. As shown in FIG. 5, upon application of a first pulse $P_1$, the luminous element $M_1$ is lighted; upon application of a second pulse $P_2$, the luminous element $M_2$ is lighted; upon application of a third pulse $P_3$, the luminous element $M_3$ is lighted; and, upon application of a fourth pulse $P_4$, the output $Q_3$ is altered to its 1 state to light the luminous element $L_2$. Thereafter, the respectively luminous elements are lighted in the order shown in FIG. 5 and, at each impression of four pulses, the lighting point of the indicator unit 8'' is shifted from one luminous element to the next in a sequential order.

In FIG. 4, there is clearly shown the relationship between the finder and the luminous elements in a camera embodying this invention. The example of FIG. 4 is different from the device of FIG. 3 in the provision a subindicator unit 26. The subindicator unit 26 comprises the luminous elements $M_1$ to $M_3$ as shown in FIG. 2. In FIG. 4, each of the luminous elements $L_1$ to $L_{16}$ corresponds to the shutter speed at the unit of 1Ev in the same manner as described above with regard to FIG. 3.

The indication of the shutter speed varies by 1Ev each time four pulses have been counted but a change within 1Ev is indicated by the indicator unit 26. Therefore, the indicator unit 8'' which indicates the shutter speed at the unit of 1Ev is considered as a main indicator unit, while the indicator unit which provides an indication corresponding to the change less than 1Ev is considered as a subindicator unit. For example, in FIG. 4, where only the luminous element $L_8$ is lighted, it is indicated that the shutter speed is ⅛ sec. but, if in addition to this, the luminous element $M_1$ is lighted, indicated that the shutter speed has shifted by ¼Ev towards 1/15 sec. from ⅛ sec.; in particular, it is ⅛(8 × 4√2̄). In general, with respect to the shutter speed T indicated by the main indicator unit 8'', i.e., the indicator unit 8'', the sub-indicator unit, i.e., the indicator unit 26, indicates a part of the unit measurement of the shutter speed as indicated by the expression $T/(4\overline{2})^N$, where N assumes an integral number from 1 to 3 identifying which of the luminous elements $M_1$ is lighted. In actual photographing, such calculation is not achieved but if not calculated, the shutter speed can be confirmed with very high accuracy. It is a matter of course that the remaining parts of the circuits shown in FIG. 2 can be constructed in exactly the same manner as in FIG. 1.

In the foregoing examples, the shutter speed is indicated using the film speed, the aperture value of the lens and the light measured value as input information, but the aperture value can be indicated using the shutter speed as input information in place of the aperture value. Further, the selection of the exposure condition for indication such as an indication of an exposure value using only the film speed and the light measured value as input information is a variation readily accomplished within the teachings of this invention.

It will be apparent that many modifications and variations may be effected without departing from the scope of the novel concepts of this invention.

What is claimed is:

1. A digital display for a camera for providing an indication of an exposure condition with respect to the level of illumination of an object being viewed comprising, in combination:

a. a light measuring circuit responsive to the illumination of the object viewed for producing an analog signal affording an exposure condition measurement;

b. first means for converting the analog signal of said light measuring circuit into a corresponding plural bit digital signal;

c. a main indicator unit including a first plurality of radiation emitting elements for selectively indicating corresponding exposure condition values in accordance with a given exposure condition measurement;

d. a subindicator unit including a second plurality of radiation emitting elements for indicating a subinterval value of the exposure condition between the exposure condition measurement indications of corresponding, adjacent elements of said main indicator unit; and e. second means for applying predetermined bits of said digital signal of said first means selectively to said main indicator unit and to said subindicator unit respectively, to selectively actuate one of said elements of said main indicator unit and one of said elements of said subindicator unit for display of an exposure condition value and a subinterval value, respectively, for each exposure condition measurement.

2. A digital display in accordance with claim 1 wherein said first means includes a pulse generator and a binary counter connected to said pulse generator for counting pulses supplied by said pulse generator.

3. A digital display in accordance with claim 2 wherein said binary counter includes a plurality of stages of flip-flop circuits connected in cascade relationship and providing as outputs corresponding ones of said plural bits of said digital signal, said pulse generator being connected to the first stage of said plurality of stages, and said second means connects the outputs of the first and second stages of said plurality of stages to said subindicator unit for selective actuation of said subindicator unit elements.

4. A digital display in accordance with claim 3 wherein said second means includes a plurality of AND circuits connecting the outputs of said first and second stages of said binary counter to said subindicator unit elements.

5. A digital display according to claim 1, wherein the analog signal of said light measuring circuit comprises the sum of an analog voltage corresponding to the intensity of the object illumination, an analog voltage corresponding to the sensitivity of the film used in the camera, and a diaphragm aperture setting of the camera lens, and wherein said digital signal is indicative of a shutter speed for said camera, and wherein actuation of said main indicator unit and said subindicator unit by said digital signal provides an indication of said shutter speed.

6. A digital display according to claim 1, wherein the analog signal of said light measuring circuit comprises the sum of an analog voltage corresponding to the intensity of object illumination, an analog voltage corresponding to the sensitivity of the film used in the camera and the shutter speed of the camera, and wherein said digital signal is indicative of an aperture value of the camera lens, and wherein the actuation of said main indicator unit and said subindicator unit by said digital signal provides an indication of the aperture value of the camera lens.

7. A digital display according to claim 1, wherein the analog signal of said light measuring circuit is also responsive to the sensitivity of the film used by the camera.

8. A digital display for use with a camera for providing an indication of the camera exposure condition in accordance with the level of illumination of an object viewed through the view finder of the camera, comprising in combination:

a. a light measuring circuit for producing a first analog output including logarithmic information corresponding to the level of illumination of the object viewed through the camera;

b. a clock pulse generator circuit for producing clock pulses of a selected repetition rate and a binary counter including first, second - - - Nth stages of flip-flop circuits connected in cascade relationship, said binary counter having an input connected to the output of said pulse generator circuit for counting the clock pulses from said generator circuit to provide a digital count output;

c. a D-A converter circuit including a plurality of input terminals correspondingly connected to the respective outputs of said flip-flop circuits for converting the digital count output of said binary counter into a second analog output;

d. a comparator circuit connected to said D-A converter circuit and to said light measuring circuit for comparing the second analog output of said D-A converter with the first analog output of said light measuring circuit for producing an output pulse when a predetermined relationship exists between said first and second analog outputs;

e. a control circuit connected to the output of said comparator circuit and between said clock pulse generator and said binary counter for transmitting said clock pulses from said clock pulse generator to said binary counter and for interrupting the transmission of said clock pulses in response to the output pulse from said comparator circuit;

f. a main indicator unit including a plurality of light emitting elements;

g. a decoder connected to the outputs of the stages of said flip-flop circuits except at least the first stage of said flip-flop circuits and to said main indicator unit for activating one of said plurality of light emitting elements in said main indicator unit corresponding to the digital count output of said binary counter;

h. a subindicator unit having at least one light emitting element; and i. means for connecting said at least one light emitting element of said subindicator unit to the output of the corresponding, said at least first stage of said flip-flop circuits for selectively activating said at least one light emitting element of said subindicator unit to provide a selective indication corresponding to the output of at least said first stage of said flip-flop circuits.

9. A digital display in accordance with claim 8 wherein said decoder is connected to the output stages of said flip-flop circuits of said binary counter, except the first and second stages of said flip-flop circuits thereof, and said subindicator unit includes three said light emitting elements, said subindicator unit being connected by said connecting means to the outputs of said first and second stages of said flip-flop circuits for selectively providing four different indications.

10. A digital display according to claim 9 wherein said subindicator unit includes three light emitting elements and wherein said light emitting elements of said subindicator unit are arranged to be selectively illuminated for three types of indications and to be collectively deenergized for a fourth type of indication.

11. A digital display in accordance with claim 8 wherein said plurality of light emitting elements of said main indicator unit are each arranged to provide for sequential illumination in increments of one Ev, where Ev is an exposure value as defined in the APEX system (ASA PH 2-1961).

12. A digital display for use with a camera for providing an indication through the view finder of the camera corresponding to the level of illumination of an object comprising, in combination:

a. a light measuring circuit for producing an analog output including logarithmic information corresponding to the illumination of the object viewed through the camera;

b. an A-D converter including a binary counter having first, second - - - - and Nth stages of flip-flop circuits each having an output terminal and connected in cascade relationship for converting said analog output from said light measuring circuit into a corresponding digital count output, said N stages being grouped as first and second sets of stages and said first set including at least said first, initial stage of said cascade connected stages, c. a main indicator unit including a plurality of light measuring elements;

d. a decoder connected to said main indicator unit and to the output terminals of said flip-flop circuits of said second set of stages, including the Nth stage of said flip-flop circuits, for lighting one of said plurality of elements of said main indicator unit in accordance with the digital count output as represented by the outputs of said flip-flop circuits of said second set;

e. a subindicator unit including at least one light emitting element; and f. means connecting the output of said first set, comprising at least said first, initial stage, and said at least one light emitting element of said subindicator unit, for selectively lighting said at least one light emitting element thereof in accordance with the digital count output as represented by the output of said at least the first stage flip-flop circuit of said first set.

* * * * *